US012560515B2

(12) United States Patent
Attanasio et al.

(10) Patent No.: US 12,560,515 B2
(45) Date of Patent: Feb. 24, 2026

(54) SPECIMEN TEST METHOD

(71) Applicants: LM WIND POWER A/S, Kolding (DK); LM WIND POWER R & D (HOLLAND) B.V., Heerhugowaard (NL)

(72) Inventors: Francesco Attanasio, Kolding (DK); Francisco Lahuerta Calahorra, Heerhugowaard (NL)

(73) Assignees: LM Wind Power A/S, Kolding (DK); LM Wind Power R&D (Holland) B.V., Heerhugowaard (NL)

( * ) Notice: Subject to any disclaimer, the term of this patent is extended or adjusted under 35 U.S.C. 154(b) by 606 days.

(21) Appl. No.: 17/916,997

(22) PCT Filed: May 19, 2021

(86) PCT No.: PCT/EP2021/063271
§ 371 (c)(1),
(2) Date: Oct. 4, 2022

(87) PCT Pub. No.: WO2021/239535
PCT Pub. Date: Dec. 2, 2021

(65) Prior Publication Data
US 2023/0160797 A1     May 25, 2023

(30) Foreign Application Priority Data
May 25, 2020     (GB) ...................................... 2007762

(51) Int. Cl.
*G01N 3/20*     (2006.01)
*G01M 5/00*     (2006.01)
*G01N 3/08*     (2006.01)

(52) U.S. Cl.
CPC ............ *G01N 3/20* (2013.01); *G01M 5/0016* (2013.01); *G01M 5/0058* (2013.01); *G01N 3/08* (2013.01);
(Continued)

(58) Field of Classification Search
CPC .... G01N 3/20; G01N 3/08; G01N 2203/0019; G01N 2203/0023; G01N 2203/0028; G01N 2203/0264; G01M 5/0016; G01M 5/0058
See application file for complete search history.

(56) References Cited

U.S. PATENT DOCUMENTS 4,003,246 A * 1/1977 Cain ........................ G01N 3/32
73/805
5,983,729 A * 11/1999 Taylor ................... G01L 5/0061
73/849

(Continued)

FOREIGN PATENT DOCUMENTS

CN      109655333 A     4/2019
EP        3363742 B1     10/2019
(Continued)

OTHER PUBLICATIONS

HG Lee et al, "Fatigue failure of a composite wind turbine blade at its root end", pp. 878-885, Composite Structures vol. 133, Aug. 7, 2015 XP 029282185.

(Continued)

*Primary Examiner* — Jonathan M Dunlap
(74) *Attorney, Agent, or Firm* — Dority & Manning, P.A.

(57) ABSTRACT

Disclosed is a test rig and a method for mechanical load testing of a specimen extending along a longitudinal axis from a first specimen end to a second specimen end and comprising a composite material extending along the longitudinal axis from a first composite end to a second
(Continued)

composite end and a primary elongate component extending along the longitudinal axis from a first primary component end to a second primary component end, the first primary component end being the first specimen end, and wherein the composite material encapsulates the primary elongate component along a first interface region extending along the longitudinal axis from the second primary component end to the first composite end. The method comprises applying a load to the specimen resulting in an axial load component and a bending moment being imposed to the specimen.

25 Claims, 7 Drawing Sheets

(52) U.S. Cl.
CPC ................ *G01N 2203/0019* (2013.01); *G01N 2203/0023* (2013.01); *G01N 2203/0028* (2013.01); *G01N 2203/0264* (2013.01)

(56) References Cited

U.S. PATENT DOCUMENTS

| | | | | |
|---|---|---|---|---|
| 7,163,378 | B2 * | 1/2007 | Kildegaard | ............. B29C 70/86 |
| | | | | 416/248 |
| 8,393,216 | B2 * | 3/2013 | Guy | ...................... G01M 7/022 |
| | | | | 73/579 |
| 9,372,137 | B1 * | 6/2016 | Patten | ...................... G01N 3/02 |
| 9,664,603 | B2 * | 5/2017 | Heiss-Chouquet | .......................... |
| | | | | G01N 33/386 |
| 9,976,537 | B2 * | 5/2018 | Dahl | ...................... F03D 1/0675 |
| 10,054,527 | B2 * | 8/2018 | Liu | ...................... G01M 99/007 |
| 11,524,765 | B2 * | 12/2022 | Rosemeier | .......... G01M 5/0016 |
| 2013/0327152 | A1 * | 12/2013 | Chen | ......................... G01N 3/08 |
| | | | | 73/818 |
| 2014/0238145 | A1 * | 8/2014 | Tran | ......................... G01N 3/20 |
| | | | | 73/851 |
| 2015/0268144 | A1 | 9/2015 | Clark | |
| 2020/0370532 | A1 * | 11/2020 | Hesse | ..................... F03D 80/50 |

FOREIGN PATENT DOCUMENTS

| | | |
|---|---|---|
| GB | 2548589 A | 9/2017 |
| JP | H4-164231 A | 6/1992 |

OTHER PUBLICATIONS

Office Action dated Feb. 17, 2025 issued in corresponding European Application No. 21728019.7.

* cited by examiner

SPECIMEN TEST METHOD

This is a National Phase Application filed under 35 U.S.C. 371 as a national stage of PCT/EP2021/063271, filed May 19, 2021, an application claiming the benefit of Great Britain Application No. 2007762.4, filed May 25, 2020, the content of each of which is hereby incorporated by reference in its entirety.

The present disclosure relates to testing of specimens, more specifically, the present disclosure relates to a test rig and a method for mechanical load testing of specimens, such as specimen comprising interfaces between composite material and other elements, such as metal elements, e.g. bolt connections.

BACKGROUND

Wind turbines blades are typically fastened to a hub of the wind turbine by bolted joints. Similarly, other connections of a wind turbine blade, e.g. modular blade joints, may rely on bolted joints. Some of these connections are subject to quite extensive stress, and therefore such assemblies must be thoroughly tested to make sure the joints are able to handle the stress.

Bolt connections are usually tested mechanically for quasi-static and fatigue cases using specimens with one or more bolted joints. The mechanical tests are conventionally performed by subjecting the specimen to axial loadings, while measuring response to increasing loads as well as repeated cyclic loads.

SUMMARY

It is an object of the present disclosure to provide a method and a test setup, such as a test rig, to facilitate more precise and sufficient load testing of test specimens of structural components. Particular structural components of a wind turbine blade, such as bolt connections, e.g. root bolt connections.

Thus, the present disclosure relates to a test rig and a method for mechanical load testing of a specimen. Particularly of a specimen extending along a longitudinal axis from a first specimen end to a second specimen end and comprising a composite material extending along the longitudinal axis from a first composite end to a second composite end and a primary elongate component extending along the longitudinal axis from a first primary component end to a second primary component end. The first primary component end forms the first specimen end. The composite material encapsulates the primary elongate component along a first interface region extending along the longitudinal axis from the second primary component end to the first composite end.

Accordingly, a method for mechanical load testing of the specimen is disclosed, wherein the method comprises: securing the first specimen end to a first connection part of a test rig; securing the second specimen end to a second connection part of the test rig; and applying a load to the specimen by applying compression and/or tension forces between the first connection part and the second connection part of the test rig. The applied load is provided such that it results in an axial load component and a bending moment being imposed to the specimen.

Also disclosed is a test rig for mechanical load testing of the specimen, wherein the test rig comprises a first connection part adapted to secure the first specimen end, and a second connection part adapted to secure the second specimen end. The test rig is operable to apply a load to the specimen by applying compression and/or tension forces between the first connection part and the second connection part of the test rig. The applied load is provided such that it results in an axial load component and a bending moment being imposed to the specimen.

By testing the specimens by applying a load comprising both an axial load and a bending moment, a load is applied being more in line with the actual load conditions of the component during intended use. Thereby, the test loads are closer to real use-conditions, meaning that potential failures may be prevented, and error margins may potentially be reduced.

BRIEF DESCRIPTION OF THE FIGURES

Embodiments of the disclosure will be described in more detail in the following with regard to the accompanying figures. The figures show one way of implementing the present disclosure and are not to be construed as being limiting to other possible embodiments falling within the scope of the attached claim set.

DETAILED DESCRIPTION

Figure 1:
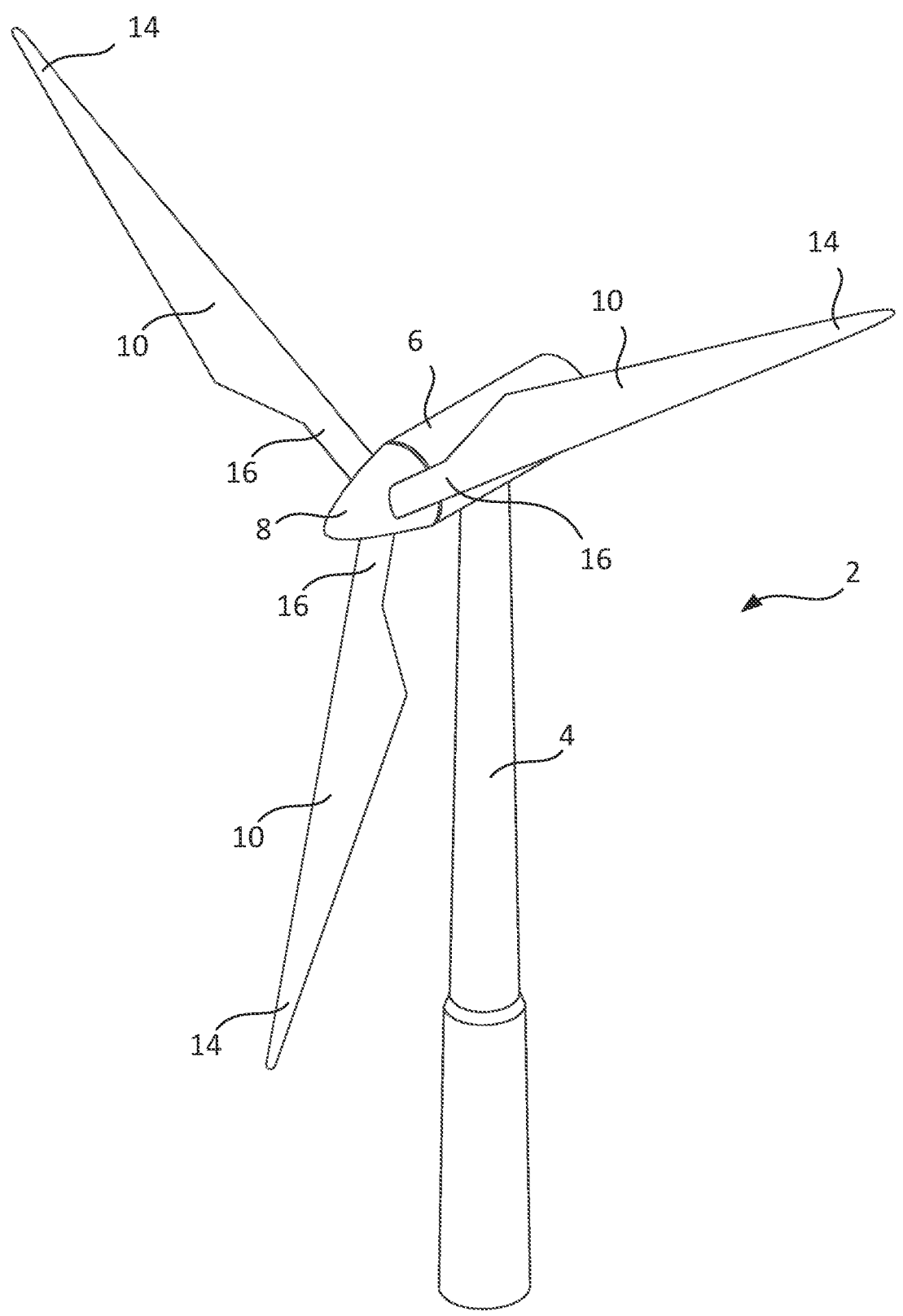
FIG. 1 schematically illustrates a conventional modern upwind wind turbine.

A method and a test rig for mechanical load testing of a specimen are disclosed. Particularly of a specimen extending along a longitudinal axis from a first specimen end to a second specimen end. The specimen may further comprise a composite material extending along the longitudinal axis from a first composite end to a second composite end and a primary elongate component extending along the longitudinal axis from a first primary component end to a second primary component end. The composite material may encapsulate, and may bond to, the primary elongate component along a first interface region extending along the longitudinal axis from the second primary component end to the first composite end. The first primary component end may form the first specimen end.

The second composite end may be the second specimen end. Alternatively, the specimen may comprise a secondary elongate component extending along the longitudinal axis from a first secondary component end to a second secondary component end. The second secondary component end may be the second specimen end. The composite material may encapsulate the secondary elongate component along a second interface region extending along the longitudinal axis. The secondary elongate component may be coaxial with the primary elongate component.

The composite material may be substantially symmetrical about the longitudinal axis. The primary elongate component may be substantially symmetrical about the longitudinal axis. The secondary elongate component may be substantially symmetrical about the longitudinal axis. The composite material, the primary elongate component and optionally the secondary elongate component may be coaxial about the longitudinal axis. The primary elongate component may be a substantially cylindrical element, such as a bolt and/or a bolt insert. The secondary elongate component may be a substantially cylindrical element, such as a bolt and/or a bolt insert. The composite material may form a substantially cylindrical element. The composite material may comprise reinforcing fibres, such as glass fibre and/or carbon fibre, suspended in a matrix of resin. The resin may be epoxy resin, polyester resin or vinyl ester resin (or other).

The test rig may comprise a first connection part. The first specimen end may be secured to the first connection part of the test rig. The first connection part may be adapted to secure the first specimen end. The first specimen end may be secured to the first connection part to allow rotational movement of the first specimen end, e.g. relative to the first connection part. Securing the first specimen end to the first connection part may comprise securing the first specimen end to the first connection part to allow rotational movement of the first specimen end, e.g. relative to the first connection part. The first connection part may be adapted to secure the first specimen end to allow rotational movement of the first specimen end relative to the first connection part. The test rig may be adapted to allow translational movement of the first specimen end, e.g. relative to the second connection part.

The test rig may comprise a second connection part. The second connection part may be formed by a floor or a common platform of the test rig. The second specimen end may be secured to the second connection part of the test rig. The second connection part may be adapted to secure the second specimen end.

Securing the second specimen end to the second connection part may comprise fastening the second specimen end to the second connection part, e.g. to prevent rotational and/or translational movement of the second specimen end relative to the second connection part. The second connection part may be adapted to secure the second specimen end to prevent rotational movement of the second specimen end, e.g. relative to the second connection part. Alternatively, securing the second specimen end to the second connection part of the test rig may comprise securing the second specimen end to the second connection part, e.g. to allow rotational movement of the second specimen end, e.g. relative to the second connection part. The second connection part may be adapted to secure the second specimen end to allow rotational movement of the second specimen end relative to the second connection part. The test rig may be adapted to allow translational movement of the second specimen end, e.g. relative to the first connection part.

A load may be applied to the specimen by applying compression and/or tension forces between the first connection part and the second connection part of the test rig. The test rig may be operable to apply a load to the specimen by applying the compression and/or tension forces between the first connection part and the second connection part. The applied load may be provided such that it results in an axial load component and a bending moment being imposed to the specimen.

Applying the load to the specimen may comprise applying a first force between the first connection part and the second connection part in a first direction at an angle relative to the longitudinal axis of the specimen. For example, the test rig may be operable to apply the load to the specimen by applying the first force between the first connection part and the second connection part in the first direction at the angle relative to the longitudinal axis of the specimen.

Applying the load to the specimen may comprise applying a second force between the first connection part and the second connection part in a second direction parallel to the longitudinal axis of the specimen. The second direction may be offset from the longitudinal axis by an offset distance. The offset distance may be between 0.1-100 mm, such as between 5 and 30 mm, such as between 10 and 20 mm. The first connection part may be adapted to secure the first specimen with an offset distance between the longitudinal axis of the specimen and the first connection part. For example, such that the test rig may be operable to apply the load to the specimen by applying the second force between the first connection part and the second connection part in the second direction parallel to the longitudinal axis of the specimen and offset by the offset distance.

Applying the load to the specimen may comprise applying a force distribution across the width of the first specimen end. The force distribution may be asymmetric about the longitudinal axis. For example, the test rig may be operable to apply the load to the specimen by applying the force distribution across the width of the first specimen end.

The test rig may comprise a first actuator and optionally a second actuator operable to apply the load to the specimen. The first connection part may form part of the first actuator. The second connection part may form part of the second actuator. The first actuator and the second actuator may be coaxial. Alternatively, the first actuator and the second actuator may be connected to a beam forming part of the first connection part.

The test rig may comprise a beam. For example, the first connection part of the test rig may comprise the beam. The beam may be extending between a first beam end and a second beam end. The first actuator may be attached to the first beam end. The second actuator may be attached to the second beam end. Securing the first specimen end to the first connection part may comprise securing the first specimen end to an intermediate beam position between the first beam end and the second beam end. The first connection part may be adapted to secure the first specimen by securing the first specimen end to the intermediate beam position. The first actuator and the second actuator may be operated to apply different forces, thereby imposing a bending moment in the specimen.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
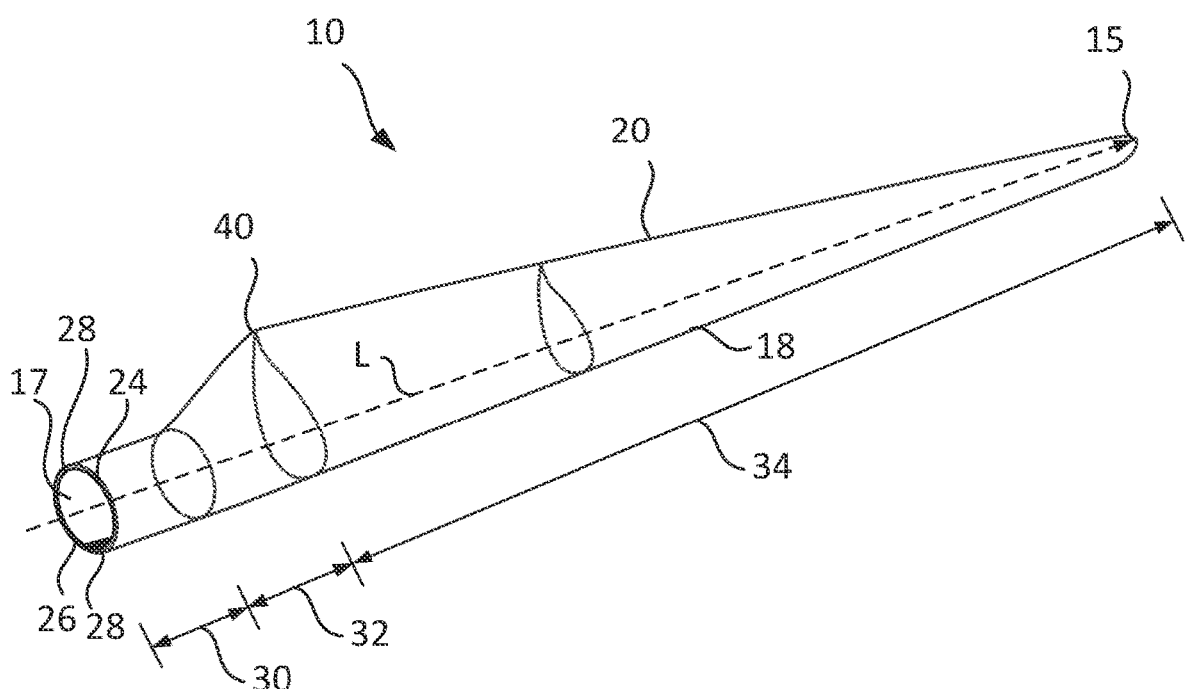
FIG. 2 schematically illustrates an exemplary wind turbine blade.

FIG. 2 schematically illustrates an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

Figure 3:
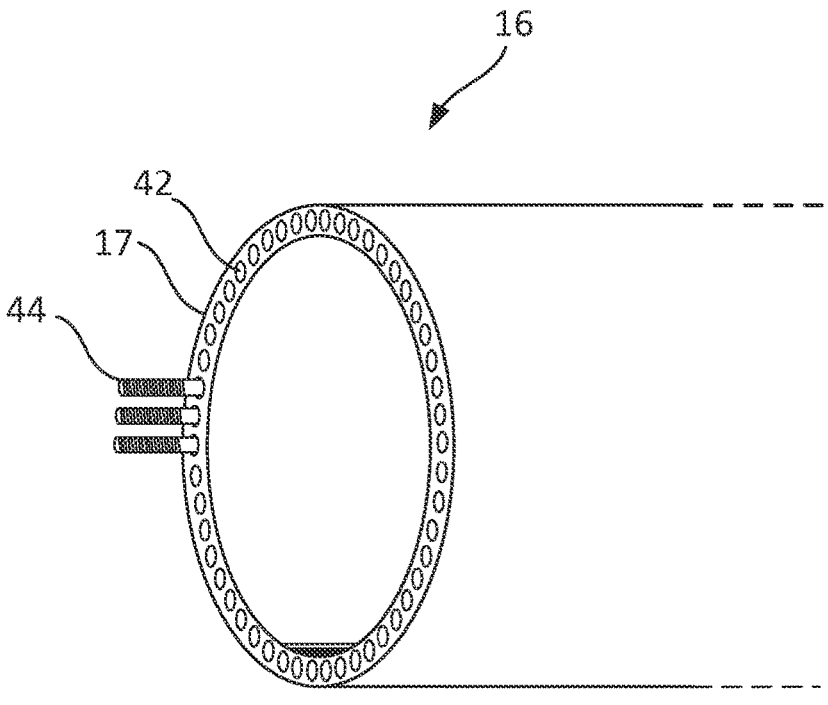
FIG. 3 schematically illustrates a root of an exemplary wind turbine blade.

FIG. 3 schematically illustrates a root 16 of an exemplary wind turbine blade, such as the wind turbine blade 10 as illustrated in the previous figures.

The root 16 comprises, at the root end 17, a plurality of bolt inserts 42. The plurality of bolt receivers 42 may be fitted with a plurality of bolts 44. For simplicity, only three bolts 44 are illustrated. However, it will be understood that a bolt 44 may be provided for each bolt insert 42. The bolt

44 may be attached to the bolt insert 42 by being threadedly connected with an internal thread inside the bolt insert 42, e.g. a barrel nut, which may be encapsulated in the material of the root end 17 during manufacture of the root 16. Alternatively, the bolts 44 may be embedded directly in the root 16, e.g. by embedding bolts 44 in the root end 17 during manufacture of the root 16.

The bolt inserts 42 and/or the bolts 44 are responsible for attachment of the wind turbine blade to the hub of the wind turbine. Thus, the bolt inserts 42 and/or the bolts 44 are critical components to avoid extreme failure of the wind turbine. Under dimensioned bolt inserts 42 and/or connector bolts 44 and/or weak coupling between the material of the root 16 and the bolt insert 42 and/or connector bolts 44, could result in catastrophic failure, such as disconnection of an entire blade from the hub.

Figure 4:
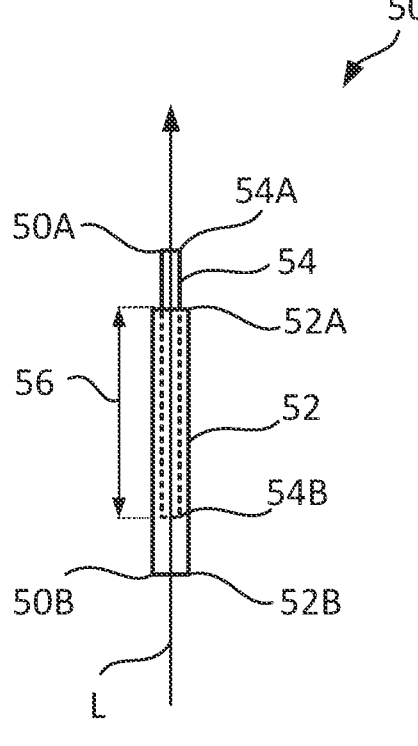
FIG. 4 schematically illustrates a specimen of a root connector.

FIG. 4 schematically illustrates a specimen 50 of a root connector, e.g. comprising a bolt insert 42 and a bolt 44 as illustrated in relation to FIG. 3. The specimen 50 extends along a longitudinal axis L from a first end 50A to a second end 50B. The specimen 50 comprises composite material 52 extending along the longitudinal axis L from a first composite end 52A to a second composite end 52B. The specimen 50 comprises a primary elongate component 54, e.g. comprising a bolt insert 42 and/or a bolt 44 as illustrated in FIG. 3. The primary elongate component 54 extends along the longitudinal axis L, from a first primary component end 54A to a second primary component end 54B.

As seen in the illustrated example, the first primary component end 54A corresponds to the first specimen end 50A. In the illustrated example, the second composite end 52B is the second specimen end 50B.

The composite material 52 encapsulates the primary elongate component 54 along a first interface region 56 extending along the longitudinal axis L from the second primary component end 54B to the first composite end 52A.

The composite material 52 and the primary elongate component 54 is substantially symmetrical about the longitudinal axis L.

Figure 5:
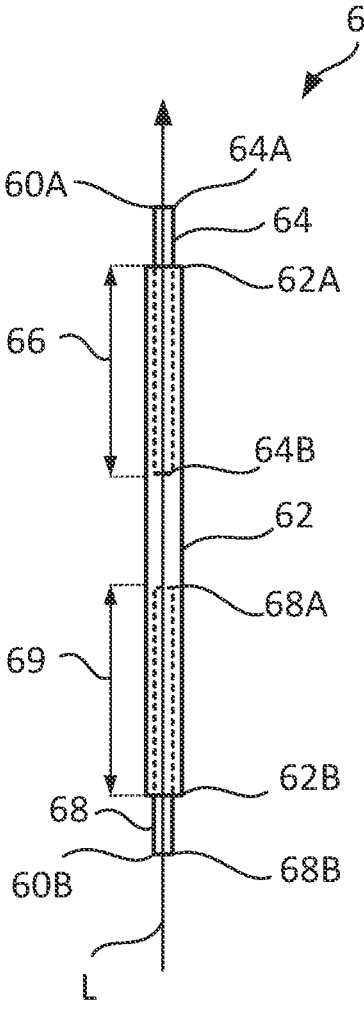
FIG. 5 schematically illustrates a specimen of a root connector.

FIG. 5 schematically illustrates an alternative specimen 60 of a root connector, e.g. comprising a bolt insert 42 and a bolt 44 as illustrated in relation to FIG. 3. The specimen 60 of FIG. 5 is a symmetric specimen comprising identical ends, which may simplify some tests. Furthermore, strength tests of the specimen 60 as compared to the specimen 50 of FIG. 4 has the advantage that two interfaces are included in the test, resulting in a more reliable test.

The specimen 60 extends along a longitudinal axis L from a first end 60A to a second end 60B. The specimen 60 comprises composite material 62 extending along the longitudinal axis L from a first composite end 62A to a second composite end 62B. The specimen 60 comprises a primary elongate component 64, e.g. comprising a bolt insert 42 and/or a connector bolt 44 as illustrated in FIG. 3. The primary elongate component 64 extends along the longitudinal axis L, from a first primary component end 64A to a second primary component end 64B. The specimen 60 comprises a secondary elongate component 68, e.g. comprising another bolt insert 42 and/or another bolt 44 as illustrated in FIG. 3. The secondary elongate component 68 extends along the longitudinal axis L from a first secondary component end 68A to a second secondary component end 68B. The secondary elongate component 68 is coaxial with the primary elongate component 64.

As seen in the illustrated example, the first primary component end 64A corresponds to the first specimen end 60A. In the illustrated example, the second secondary component end 68B is the second specimen end 60B.

The composite material 62 encapsulates the primary elongate component 64 along a first interface region 66 extending along the longitudinal axis L from the second primary component end 64B to the first composite end 62A. The composite material 62 encapsulates the secondary elongate component 68 along a second interface region 69 extending along the longitudinal axis L from the first secondary component end 68A to the second composite end 62B.

The composite material 62, the primary elongate component 64, the secondary elongate component 68 is substantially symmetrical about the longitudinal axis L.

Figure 6:
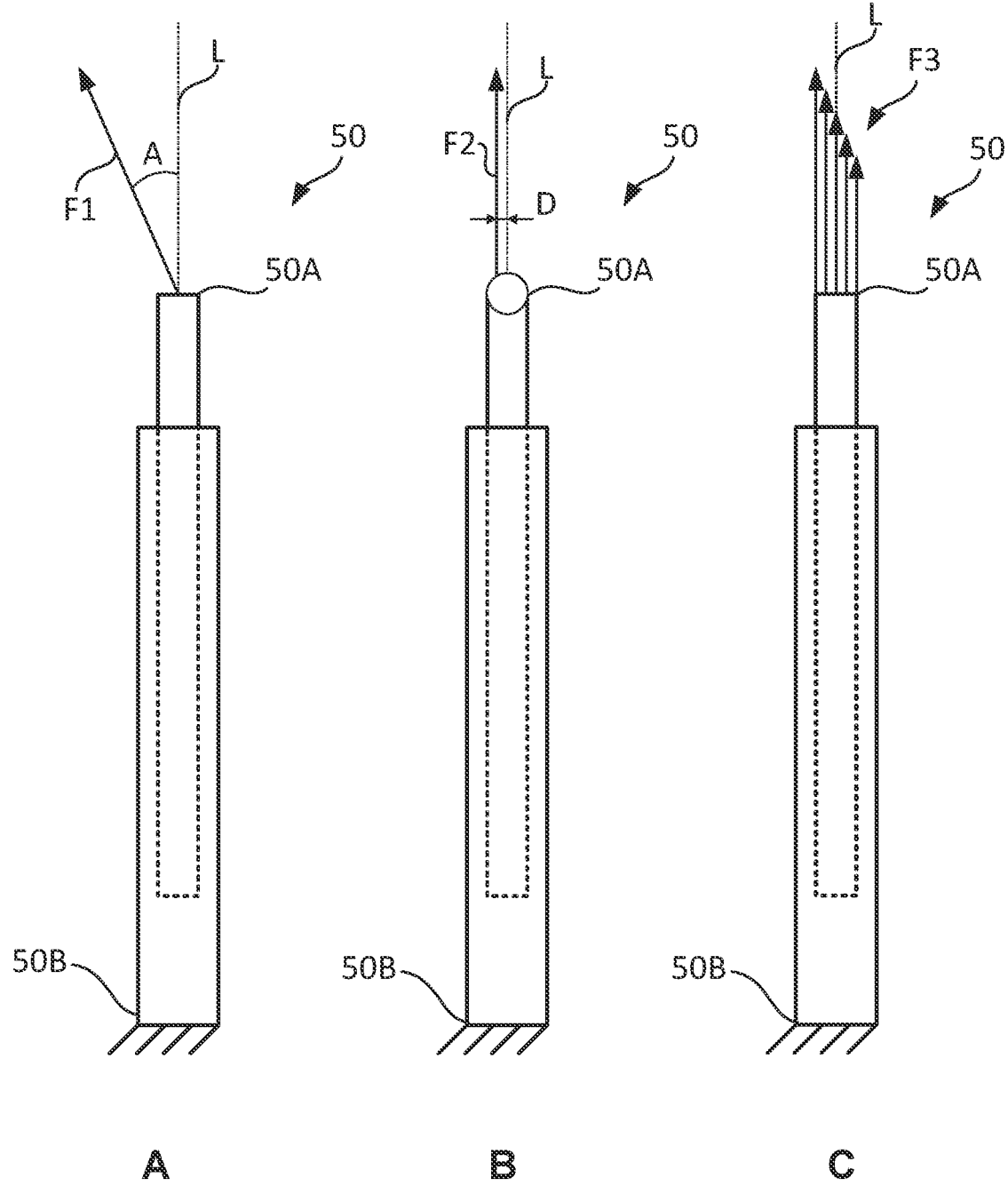
FIGS. 6A-6C schematically illustrates examples of applying a load to a specimen, FIGS. 7A-7B schematically illustrates examples of applying a load to a specimen, FIGS. 8A-8C schematically illustrates exemplary test rigs, FIG. 9 schematically illustrates an exemplary specimen, and FIG. 10 schematically illustrates an exemplary connection frame.

FIGS. 6A-6C schematically illustrates examples of applying a load to a specimen 50, such as the specimen 50 as described in relation to FIG. 4, wherein the applied load results in an axial load component and a bending moment being imposed to the specimen 50.

In the illustrated examples, the second specimen end 50B is secured, e.g. to a second connection part of a test rig, by fastening the second specimen end 50B to prevent rotational movement and translational movement of the second specimen end 50B, e.g. relative to the element to which the second specimen end 50B is attached, e.g. the second connection part of the test rig. For example, the second specimen end 50B may be attached to a floor. In some alternative examples, the second specimen end 50B may be secured to allow rotational and/or translational movement of the second specimen end 50B.

The first specimen end 50A is secured to a first connection part of a test rig (not shown), and the test rig is configured to apply a load between the first connection part and the second specimen end 50B, which may be secured to a second connection part, such as a floor, of the test rig. The first specimen end 50A may be secured to allow rotational and/or translational movement of the first specimen end 50A.

The applied load is provided such that it results in an axial load component and a bending moment being imposed to the specimen 50. For example, as illustrated in FIG. 6A, applying the load may comprise applying a first force F1 in a first direction at an angle A relative to the longitudinal axis L of the specimen 50. Alternatively, as illustrated in FIG. 6B, applying the load may comprise applying a second force F2 in a second direction, e.g. parallel to the longitudinal axis L of the specimen, wherein the second direction is offset from the longitudinal axis L by an offset distance D. Alternatively, as illustrated in FIG. 6C, applying the load may comprise applying a force distribution F3 across the width of the first specimen end 50A, wherein the force distribution is asymmetric about the longitudinal axis L.

Figure 7:
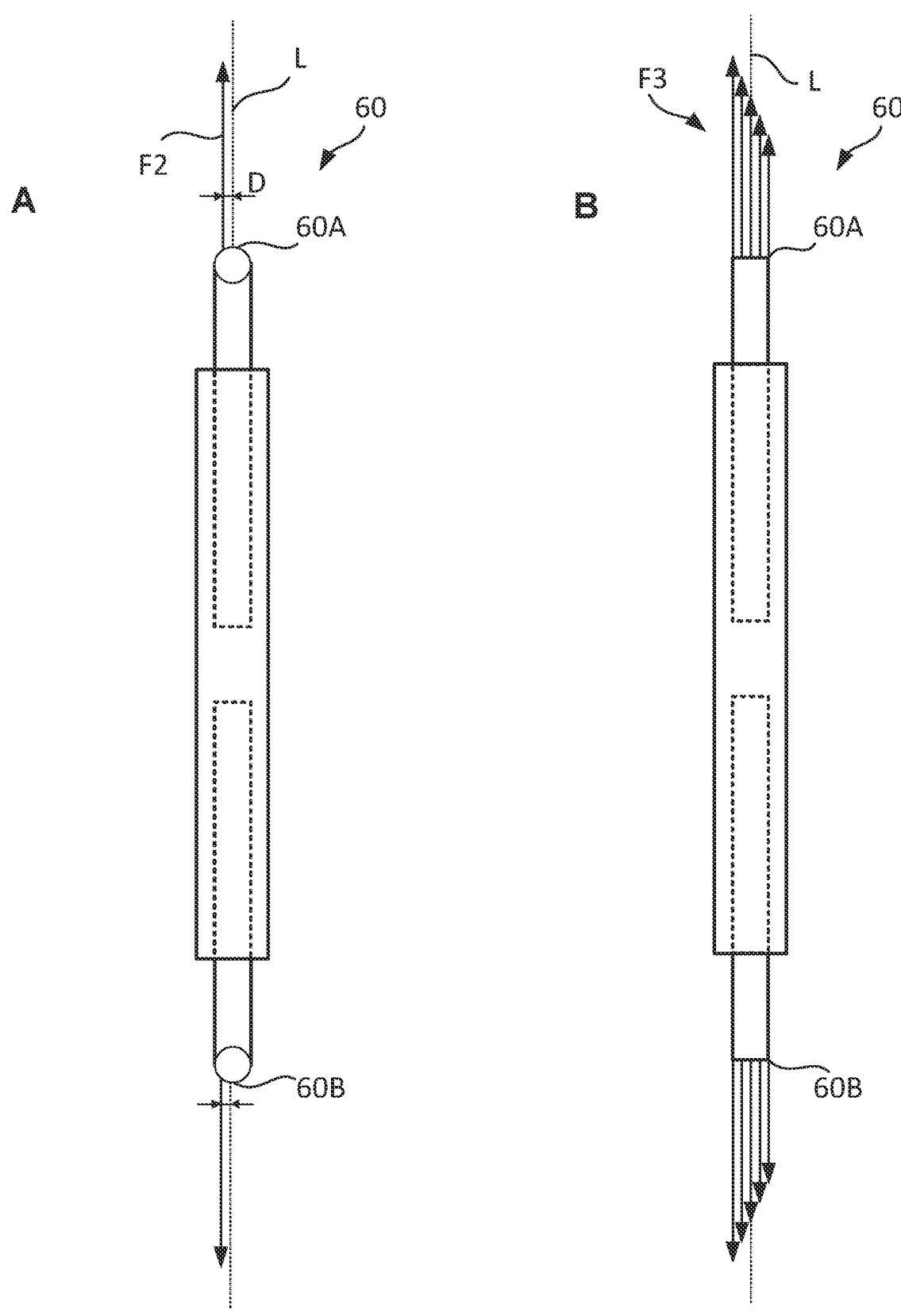

FIGS. 7A-7B schematically illustrates examples of applying a load to a specimen 60, such as the specimen 60 as described in relation to FIG. 5, wherein the applied load results in an axial load component and a bending moment being imposed to the specimen 60.

The first specimen end 60A is secured to a first connection part of a test rig (not shown) and the second specimen end 60B is secured to a second connection part of the test rig. The test rig is configured to apply a load between the first specimen end 60A and the second specimen end 60B. The first specimen end 60A and/or the second specimen end 60B may be secured to allow rotational and/or translational movement thereof.

The applied load is provided such that it results in an axial load component and a bending moment being imposed to the specimen 60. For example, as illustrated in FIG. 7A, applying the load may comprise applying a second force F2 in a second direction, e.g. parallel to the longitudinal axis L of the specimen, wherein the second direction is offset from the longitudinal axis L by an offset distance D. Alternatively, as illustrated in FIG. 7B, applying the load may comprise applying a force distribution F3 across the width of the first specimen end 60A, wherein the force distribution is asymmetric about the longitudinal axis L.

Figure 8:
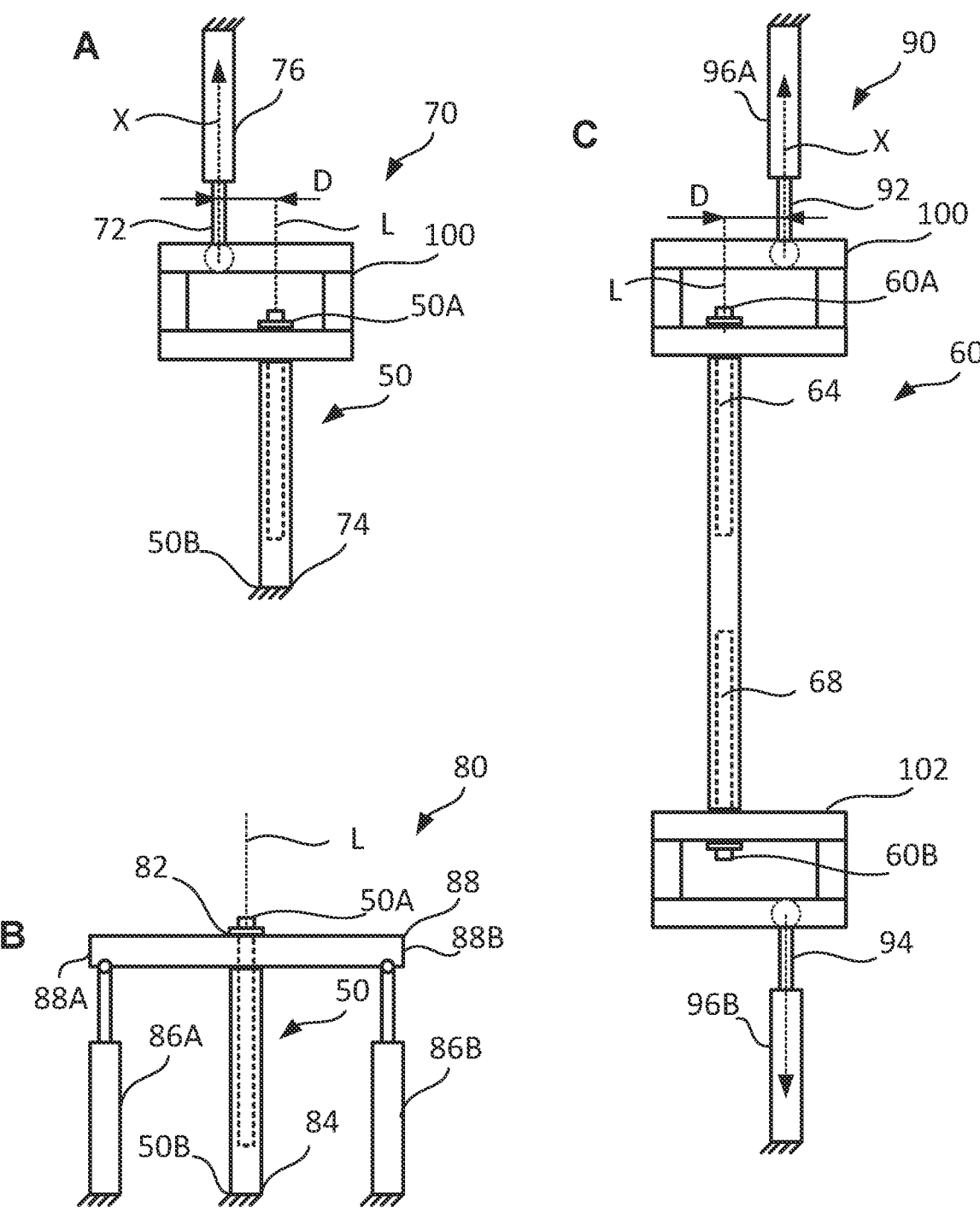

FIGS. 8A-8C schematically illustrates exemplary test rigs 70, 80, 90 for applying a load to a specimen, such as the specimen 50 as described in relation to FIG. 4 and/or the specimen 60 as described in relation to FIG. 5, such that the applied load results in an axial load component and a bending moment being imposed to the specimen 50, 60.

In FIG. 8A the test rig 70 comprises a first connection part 72, secured to the first specimen end 50A of the specimen 50, e.g. the first connection part 72 is secured to the primary elongate component of the specimen 50. The test rig 70 comprises a second connection part 74 being secured to the second specimen end 50B. The first connection part 72 is secured to the first specimen end 50A by a first connection frame 100.

The first specimen end 50A is secured to the first connection part 72 of the test rig 70 to allow rotational movement of the first specimen end 50A relative to the first connection part 72. The second specimen end 50B is fastened to the second connection part 74 of the test rig 70 to prevent rotational movement and translational movement of the second specimen end 50B relative to the second connection part 74.

The test rig 70 comprises an actuator 76, configured to apply a force, e.g. a linear force. The actuator 76 is operable to apply compression and/or tension forces between the first connection part 72 and the second connection part 72 of the test rig 70. The first connection part 72 forms part of the actuator 76. The actuator 76 applies a force between the first connection part and the second connection part in a direction X parallel to the longitudinal axis L of the specimen 50, wherein the direction X is offset from the longitudinal axis L by an offset distance D. Because of the offset distance D, a moment is imposed to the specimen by applying the force along the direction X. The moment experienced by the specimen 50 in the test rig 70 of FIG. 8A, is greatest at the second specimen end 50B of the specimen 50 and decreasing towards the first specimen end 50A.

The offset distance D is, for the purpose of illustration, exaggerated. The offset distance may be in the range of 5-30 mm, while the length of the first specimen 50 may have a length of about 0.5 m.

In FIG. 8B the test rig 80 comprises a first connection part 82, secured to the first specimen end 50A of the specimen 50, e.g. the first connection part 82 is secured to the primary elongate component of the specimen 50. The test rig 80 comprises a second connection part 84 being secured to the second specimen end 50B. The second connection part 84 may be provided by a floor.

The second specimen end 50B is fastened to the second connection part 84 of the test rig 80 to prevent rotational movement and translational movement of the second specimen end 50B relative to the second connection part 84.

The test rig 80 comprises a first actuator 86A and a second actuator 86B, configured to jointly apply a force and/or a force distribution to the specimen 50. The actuators 86A, 86B are operable to apply compression and/or tension forces. The first connection part 82 of the test rig 80 comprises a beam 88 extending between a first beam end 88A and a second beam end 88B. The first actuator 86A is attached to the first beam end 88A and the second actuator 86B is attached to the second beam end 88B. The first specimen end 50A is secured to an intermediate beam position between the first beam end 88A and the second beam end 88B.

The first actuator 86A and the second actuator 86B are configured to, via the beam 88, jointly apply a force and/or a force distribution to the specimen 50 between the first connection part 82 and the second connection part 84 of the test rig 80. The actuators 86A, 86B via the beam 88 apply a load between the first connection part 82 and the second connection part 84, and by varying the contribution of the first actuator 86A and the second actuator 86B to the applied load, a bending moment may be imposed to the specimen 50. The bending moment experienced by the specimen 50 in the test rig 80 of FIG. 8B, is greatest at the second specimen end 50B of the specimen 50 and decreasing towards the first specimen end 50A.

In FIG. 8C the test rig 90 comprises a first connection part 92, secured to the first specimen end 60A of the specimen 60, e.g. the first connection part 92 is secured to the primary elongate component 64 of the specimen 60. The test rig 90 comprises a second connection part 94 being secured to the second specimen end 60B, e.g. the second connection part 94 is secured to the secondary elongate component 68 of the specimen 60. The first connection part 92 is secured to the first specimen end 60A by a first connection frame 100. The second connection part 94 is secured to the second specimen end 60B by a second connection frame 102.

The first specimen end 60A is secured to the first connection part 92 of the test rig 90 to allow rotational movement of the first specimen end 60A relative to the first connection part 92. The second specimen end 60B is secured to the second connection part 94 of the test rig 90 to allow rotational movement of the second specimen end 60B relative to the second connection part 94.

The test rig 90 comprises a first actuator 96A and a second actuator 96B, configured to jointly apply a force and/or a force distribution to the specimen 60. The actuators 96A, 96B are operable to apply compression and/or tension forces between the first connection part 92 and the second connection part 94 of the test rig 90. The first connection part 92 forms part of the first actuator 96A. The second connection part 94 forms part of the second actuator 96B. The actuators 96A, 96B apply a force between the first connection part 92 and the second connection part 94 in a direction X parallel to the longitudinal axis L of the specimen 60, wherein the direction X is offset from the longitudinal axis L by an offset distance D. Because of the offset distance D, a moment is imposed to the specimen by applying the force along the direction X. The moment experienced by the specimen 60 in the test rig 90 of FIG. 8C, is, because of the symmetry of the specimen 60, greatest in the middle of the specimen 60 between the first specimen end 60A and the second specimen end 60B, and decreasing towards the first specimen end 60A and the second specimen end 60B.

The offset distance D is, for the purpose of illustration, exaggerated. The offset distance may be in the range of 5-30 mm, while the length of the first specimen 50 may have a length of about 0.5 m.

Figures 9, 10:
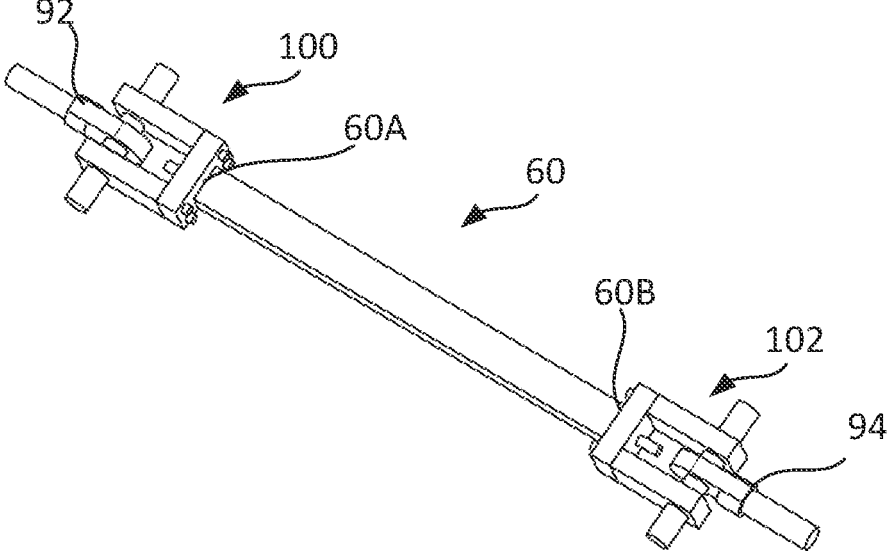

FIG. 9 schematically illustrates an exemplary specimen 60 being a symmetrical specimen, wherein the first specimen end 60A is connected to a first connection part 92 of a test rig by a first connection frame 100. Similarly, the second specimen end 60B is connected to a second connection part 94 of the test rig by a second connection frame 102.

FIG. 10 schematically illustrates an exemplary connection frame 100, 102, such as the connection frames 100, 102 of FIG. 9, also the connection part 92, 94 of the test rig is illustrated. As illustrated, the connection frame 100, 102 comprises a specimen connection point 104. The specimen connection point 104 is provided at a position with a distance D1 from one side of the connection frame 100, 102 and a distance D2 from the opposite side of the connection frame 100, 102. The distance D1 may be bigger than the distance D2. Thus, the specimen connection point 104 is offset from the centre of the frame 100, 102, i.e. not coaxial with the axis of the connection part 92, 94.

Thereby, a linear compression or tension applied via the connection part 92, 94 impose a bending moment in the specimen.

As also illustrated, the connection part 92, 94 is connected with the connection frame 100, 102 by a hinge-coupling, allowing rotation between the connection part 92, 94 and the connection frame 100, 102, e.g. in the plane of the offset of the specimen connection point 104. Thereby, avoiding bending moments being transferred to the test rig.

In the illustrated examples, the loads are illustrated as a tension force. However, it should be understood that also a compression force may be applied using the same principles.

The disclosure has been described with reference to a preferred embodiment. However, the scope of the invention is not limited to the illustrated embodiment, and alterations and modifications can be carried out without deviating from the scope of the invention.

Throughout the description, the use of the terms "first", "second", "third", "fourth", "primary", "secondary", "tertiary" etc. does not imply any particular order or importance, but are included to identify individual elements. Furthermore, the labelling of a first element does not imply the presence of a second element and vice versa.

LIST OF REFERENCES

2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
40 shoulder
42 bolt insert
44 bolt
50, 60 specimen
50A, 60A first specimen end
50B, 60B second specimen end
52, 62 composite material
52A, 62A first composite end
52B, 62B second composite end
54, 64 primary elongate component
54A, 64A first primary component end
54B, 64B second primary component end 56, 66 first interface region
68 secondary elongate component
68A first secondary component end
68B second secondary component end
69 second interface region
70, 80, 90 test rig
72, 82, 92 first connection part
74, 84, 94 second connection part
76, 86A, 96A first actuator
86B, 96B second actuator
88 beam
88A first beam end
88B second beam end
100 first connection frame
102 second connection frame
L longitudinal axis
X force direction
A angle
D offset distance
F1 first force
F2 second force
F3 force distribution

The invention claimed is:

1. A method for mechanical load testing of a specimen extending along a longitudinal axis from a first specimen end to a second specimen end and comprising a composite material extending along the longitudinal axis from a first composite end to a second composite end and a primary elongate component extending along the longitudinal axis from a first primary component end to a second primary component end, the first primary component end being the first specimen end, and wherein the composite material encapsulates the primary elongate component along a first interface region extending along the longitudinal axis from the second primary component end to the first composite end, wherein the method comprises:

securing the first specimen end to a first connection part of a test rig, wherein the first connection part of the test rig comprises a beam extending between a first beam end and a second beam end, wherein a first actuator is attached to the first beam end, and wherein securing the first specimen end to the first connection part comprises securing the first specimen end to an intermediate beam position between the first beam end and the second beam end;

securing the second specimen end to a second connection part of the test rig; and applying a load to the specimen by applying a force between the first connection part and the second connection part of the test rig, wherein the force is selected from the group consisting of a compression force, a tension force and a combination thereof, wherein the applied load results in an axial load component and a bending moment being imposed to the specimen.

2. The method according to claim 1, wherein securing the first specimen end to the first connection part of the test rig comprises securing the first specimen end to the first connection part to allow rotational movement of the first specimen end relative to the first connection part.

3. The method according to claim 1, wherein securing the second specimen end to the second connection part of the test rig comprises fastening the second specimen end to the second connection part to prevent rotational movement of the second specimen end relative to the second connection part.

4. The method according to claim 3, wherein the force is applied between the first connection part and the second connection part in a first direction at an angle relative to the longitudinal axis of the specimen.

5. The method according to claim 1, wherein securing the second specimen end to the second connection part of the test rig comprises securing the second specimen end to the second connection part to allow rotational movement of the second specimen end relative to the second connection part.

6. The method according to claim 1, wherein the second composite end is the second specimen end.

7. The method according to claim 1, wherein the specimen comprises a secondary elongate component extending along the longitudinal axis from a first secondary component end to a second secondary component end, the second secondary component end being the second specimen end, and wherein the composite material encapsulates the secondary elongate component along a second interface region extending along the longitudinal axis, the secondary elongate component being coaxial with the primary elongate component.

8. The method according to claim 7, wherein the composite material and/or the primary elongate component and/or the secondary elongate component is substantially symmetrical about the longitudinal axis.

9. The method according to claim 7, wherein the primary elongate component and/or the secondary elongate component is a substantially cylindrical element.

10. The method according to claim 1, wherein the force is applied between the first connection part and the second connection part in a second direction parallel to the longitudinal axis of the specimen, wherein the second direction is offset from the longitudinal axis by an offset distance.

11. The method according to claim 10, wherein the offset distance is between 0.1 and 100 mm.

12. The method according to claim 1, wherein the force is applied as a force distribution across a width of the first specimen end, wherein the force distribution is asymmetric about the longitudinal axis.

13. The method according to claim 1, wherein a second actuator is attached to the second beam end.

14. The method according to claim 1, wherein the composite material comprises glass fibre and/or carbon fibre suspended in a matrix of resin.

15. A test rig for mechanical load testing of a specimen extending along a longitudinal axis from a first specimen end to a second specimen end and comprising a composite material extending along the longitudinal axis from a first composite end to a second composite end and a primary elongate component extending along the longitudinal axis from a first primary component end to a second primary component end, the first primary component end being the first specimen end, and wherein the composite material encapsulates the primary elongate component along a first interface region extending along the longitudinal axis from the second primary component end to the first composite end, wherein the test rig comprises a first connection part adapted to secure the first specimen end, and a second connection part adapted to secure the second specimen end, wherein the test rig is operable to apply a load to the specimen by applying a force between the first connection part and the second connection part of the test rig, wherein the force is selected from the group consisting of a compression force, a tension force and a combination thereof, wherein the applied load results in an axial load component and a bending moment being imposed to the specimen, wherein the test rig comprises at least a first actuator operable to apply the load to the specimen, and wherein the first connection part of the test rig comprises a beam extending between a first beam end and a second beam end, and wherein the first actuator is attached to the first beam end, and wherein the first connection part is adapted to secure the first specimen by securing the first specimen end to an intermediate beam position between the first beam end and the second beam end.

16. The test rig according to claim 15, wherein the first connection part is adapted to secure the first specimen end to allow rotational movement of the first specimen end relative to the first connection part.

17. The test rig according to claim 15, wherein the second connection part is adapted to secure the second specimen end to prevent rotational movement of the second specimen end relative to the second connection part.

18. The test rig according to claim 17, wherein the force is applied between the first connection part and the second connection part in a first direction at an angle relative to the longitudinal axis of the specimen.

19. The test rig according to claim 15, wherein the second connection part is adapted to secure the second specimen end to allow rotational movement of the second specimen end relative to the second connection part.

20. The test rig according to claim 15, wherein the first connection part is adapted to secure the first specimen with an offset distance between the longitudinal axis of the specimen and the first connection part, the force being applied between the first connection part and the second connection part in a second direction parallel to the longitudinal axis of the specimen and offset by the offset distance.

21. The test rig according to claim 20, wherein the offset distance is between 5 and 30 mm.

22. The test rig according to claim 15, wherein the force is applied as a force distribution across a width of the first specimen end, wherein the force distribution is asymmetric about the longitudinal axis.

23. The test rig according to claim 15, wherein the first connection part forms part of the first actuator and wherein the second connection part forms part of a second actuator.

24. A method for mechanical load testing of a specimen extending along a longitudinal axis from a first specimen end to a second specimen end and comprising a composite material extending along the longitudinal axis from a first composite end to a second composite end and a primary elongate component extending along the longitudinal axis from a first primary component end to a second primary component end, the first primary component end being the first specimen end, and wherein the composite material encapsulates the primary elongate component along a first interface region extending along the longitudinal axis from the second primary component end to the first composite end, wherein the method comprises:

securing the first specimen end to a first connection part of a test rig;

securing the second specimen end to a second connection part of the test rig; and applying a load to the specimen by applying a force between the first connection part and the second connection part of the test rig, wherein the force is selected from the group consisting of a compression force, a tension force and a combination thereof, wherein the applied load results in an axial load component and a bending moment being imposed to the specimen, and wherein the first connection part of the test rig comprises a beam extending between a first beam end and a second beam end, wherein a first actuator is attached to the first beam end and a second actuator is attached to the second beam end, and wherein securing the first specimen end to the first connection part comprise securing the first specimen end to an intermediate beam position between the first beam end and the second beam end.

25. A test rig for mechanical load testing of a specimen extending along a longitudinal axis from a first specimen end to a second specimen end and comprising a composite material extending along the longitudinal axis from a first composite end to a second composite end and a primary elongate component extending along the longitudinal axis from a first primary component end to a second primary component end, the first primary component end being the first specimen end, and wherein the composite material encapsulates the primary elongate component along a first interface region extending along the longitudinal axis from the second primary component end to the first composite end, wherein the test rig comprises a first connection part adapted to secure the first specimen end, and a second connection part adapted to secure the second specimen end, and wherein the test rig is operable to apply a load to the specimen by applying a force between the first connection part and the second connection part of the test rig, wherein the force is selected from the group consisting of a compression force, a tension force and a combination thereof, wherein the applied load results in an axial load component and a bending moment being imposed to the specimen, wherein the test rig comprises a first actuator and a second actuator operable to apply the load to the specimen, and wherein the first connection part of the test rig comprises a beam extending between a first beam end and a second beam end, and wherein the first actuator is attached to the first beam end and the second actuator is attached to the second beam end, and wherein the first connection part is adapted to secure the first specimen by securing the first specimen end to an intermediate beam position between the first beam end and the second beam end.

* * * * *